United States Patent Office 3,642,765
Patented Feb. 15, 1972

3,642,765
MONO AZO DYESTUFFS CONTAINING A
FIBER-REACTIVE GROUP
Fritz Oesterlein, Basel, and Henry Riat, Arlesheim, Switzerland, assignors to Ciba Limited, Basel, Switzerland
No Drawing. Filed Apr. 1, 1969, Ser. No. 812,390
Int. Cl. C09d 62/08
U.S. Cl. 260—153        6 Claims

ABSTRACT OF THE DISCLOSURE

Fibre-reactive azo dyestuffs of the formula

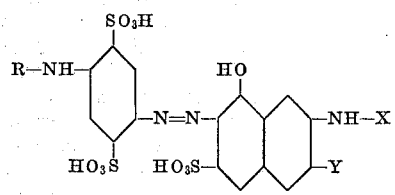

wherein X is an aryl radical of the benzene or naphthalene series, Y is a hydrogen atom or a sulfonic acid group and R is a fibre-reactive substituent.

---

It has been found that especially valuable azo dyestuffs are obtained when azo dyestuffs are prepared that as free acids correspond to the formula (1)

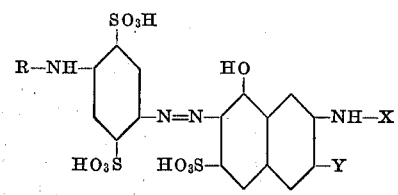

in which the symbol R represents a fibre-reactive grouping, X represents an aryl radical and Y a sulphonic acid group or preferably a hydrogen atom.

As aryl radicals X there come into consideration naphthalene and particularly benzene radicals. The radical X may contain the ordinary substituents, such as alkyl groups, especially methyl groups, halogetn atoms, particularly chlorine atoms, carboxyl and preferably sulphonic acid groups. It may also contain an amino group, for example one that contains a fibre-reactive substituent. Accordingly, X may be defined as sulfonaphthyl, phenyl or phenyl substituted by methyl, chloro, sulfo, amino or carboxy.

Examples of fibre-reactive substituents are more especially aliphatic and heterocyclic radicals. Among the heterocyclic radicals those are particularly important which contain at least 2 nitrogen atoms in the hetero ring.

The manufacture of the dyestuffs of the invention may be carried out by coupling and/or condensation. Thus, for example, a diazo compound from an amine of the formula (2)

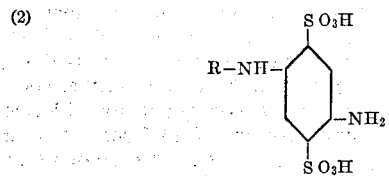

in which R has the meaning given for Formula 1, may be combined with two arylamino-8-hydroxynaphthalene-6-sulphonic acids in the presence of an agent that promotes coupling in a position adjacent to the hydroxyl group. Such agents are known. For example, phosphates may be particularly mentioned; especially good results are obtained with disodium phosphate.

Examples of arylamino-8-hydroxy-naphthalene-6-sulphonic acids that may be used as coupling components are the following: 2-phenylamino-8-hydroxynaphthalene-6-sulphonic acid and its derivatives substituted in the phenyl nucleus by methyl, chlorine, amino or carboxy groups, advantageously the corresponding 2-sulphonaphthylamino and particularly 2-sulphophenylamino-8-hydroxynaphthalene-6-sulphonic acids.

The amines whose diazo compounds are to be combined with these coupling components according to the invention may be prepared from the readily monoacylatable p-phenylene-diaminedisulphonic acid (1,4-diaminobenzene-2,5-disulphonic acid) by condensation with an acylating agent containing a fibre-reactive acyl radical.

Examples of such acylating agents are the following: α-chloro- or β-bromopropionyl chloride or bromide, α,β-dichloro- or dibromopropionylchloride or bromide, acryl chloride, α-chloro- or α-bromoacryl chloride, chlorocrotonyl chloride, propiolic acid chloride, and particularly heterocyclic acid halides and their derivatives, such as 2-chlorobenzoxazole carboxylic acid chlorides, 2-chlorobenzthiazolecarboxylic or sulphonic acid chlorides and especially the following compounds that contain at least 2 nitrogen atoms as hetero atoms of a 6-membered heterocycle:

4,5-dichloro-1-phenylpyridazonecarboxylic or sulphonic acid chloride,
4,5-dichloropyridazonepropionic acid chloride,
1,4-dichlorophthalazinecarboxylic or sulphonic acid chloride,
2,3-dichloroquinoxalinecarboxylic or sulphonic acid chloride,
2,4-dichloroquinazolinecarboxylic or sulphonic acid chloride,
2-methanesulphonyl-4-chloro-6-methylpyrimidine, tetrachloropyridazine,
2,4-bis-methanesulphonyl-6-methylpyrimidine,
2,4,6-tri- or 2,4,5,6-tetrachloropyridimine,
2,4,6-tri- or 2,4,5,6-tetrabromopyrimidine,
2-methanesulphonyl-4,5-dichloro-6-methylpyrimidine,
2,4-dichloropyrimidine-5-sulphonic acid,
5-nitro- or 5-cyano-2,4,6-trichloropyrimidine,
2,6-bis-methanesulphonylpyridine-4-carboxylic acid chloride,
5-nitro-6-methyl-2,4-dichloropyrimidine,
2,6-dichloropyrimidine-4-carboxylic acid chloride,
2,6-dichloropyrimidine-5-carboxylic acid chloride,
2,4-dichloropyrimidine-4-sulphonic acid chloride,
2,4-dichloropyrimidine-5-sulphonic acid chloride,
2,4,6-trichloro-1,3,5-triazine, and
2,4,6-tri-(benzenesulphonyl)-1,3,5-triazine
and 4,6-dichloro-1,3,5-triazines that are substituted in the 2-position by an aryl or alkyl radical, for example a phenyl, methyl or ethyl radical, or by the radical of an aliphatic or aromatic mercapto compound bound via the sulphur atom or the radical of an aliphatic or aromatic hydroxyl compound bound via the oxygen atom, or more especially by an —NH$_2$ group or by the radical of an aliphatic, heterocyclic or aromatic amino compound bound via the nitrogen atom. As examples of compounds whose radicals may be bound in the 2-position to the triazine nucleus by reaction with a trihalogen triazine, the following may be mentioned:

Aliphatic or aromatic mercapto or hydroxyl compounds, such as thio alcohols, thioglycollic acid, thiourea, thiophenols, methyl, ethyl, isopropyl alcohol, methoxyethyl alcohol, ethoxyethyl alcohol, isopropoxyethyl alcohol, methoxypropyl alcohol, glycollic acid, phenol, chloro- or nitro-phenyls, phenolcarboxylic and phenolsulphonic acids, naphthols, naphtholsulphonic acids etc., more especially ammonia and compounds containing acylatable amino groups, such as hydroxylamine, hydrazine, phenyldrazine, phenylhydrazinesulphonic acids, carbamide acid and its derivatives, semi- and thio-semicarbazides and carbazones, methyl, ethyl, isopropyl, methoxyethyl, methoxypropylamine, dimethyl, diethyl, methylphenyl, ethylenephenylamine, chloroethylamine, ethanolamines, propanolamines, benzylamine, cyclohexylamine, morpholine, piperidine, piperazine, aminocarbonic acid ester, aminoacetic acid ethyl ester, aminoethanesulphonic acid, N-methylaminoethane-sulphonic acid, particularly aromatic amines, such as aniline, N-methylaniline, toluidines, xylidines, chloranilines, p- or m-aminoacetanilide, nitranilines, aminophenols, nitrotoluidines, phenylenediamines, toluylenediamines, anisidine, phenenidine, diphenylamine, naphthylamine; aminonaphthols, diaminonaphthalenes and particularly anilines containing acid groups, such as sulphobenzylamine, sulphanilic, metanilic, orthanilic acid, anilinedisulphonic acid, aminobenzylsulphonic acid, aniline-ω-methanesulphonic acid, aminodibenzoic acid, naphthylaminomonosulphonic, naphthylaminodisulphonic and naphthylaminotrisulphonic acids, aminobenzoic acids, such as 2-hydroxy-5-aminobenzoic acid, aminonaphtholmonosulphonic, aminonaphtholdisulphonic, aminonaphthol-trisulphonic acids etc., also coloured compounds, or compounds having dyestuff character, for example 4-nitro-4'-amino-stilbenedisulphonic acid, 2-nitro-4'-aminodiphenylamine - 4,3' - stilbenedisulphonic acid, 2-nitro-4'-aminodiphenylamine-4,3'-disulphonic acid and especially amino-azo dyestuffs or aminoanthraquinones or phthalocyanines that contain at least one reactive amino group. Accordingly, R in the previous formula may be described as a fiber-reactive substituent selected from the group consisting of chloro, bromo, dichloro or dibromo alkanoyl of up to 3 carbon atoms, acrylyl, bromo or chloroalkenoyl of up to 4 carbon atoms, propioloyl, and the residue of a six-membered heterocyclic group containing at least two nitrogen atoms.

The introduction of the substituent in the 2-position of the triazine radical may be carried out also after condensation with the starting diamine or after manufacture of the dyestuff.

The monoacyl derivatives of p-phenylenediamine sulphonic acid to be used according to the invention may be diazotized in the usual manner.

Coupling takes place in the presence of an agent that as far as possible prevents coupling in the 5-position, or promotes coupling in the 7-position (position vicinal to the hydroxyl group). Examples of such agents are especially phosphates, particularly disodium phosphate. After coupling has been carried out, the resulting dyestuff may be condensed with the aforementioned acid halides if it contains an acylatable amino group in the aryl radical X.

The dyestuffs according to the invention are also obtained when 1,4-phenylenediamine-2,5-disulphonic acid is diazotized and combined with 2-arylamino-8-hydroxynaphthalene-6-sulphonic acid in an alkaline medium, and the resulting monoazo dyestuffs that contain a free amino group in the diazo radical or a free amino group both in the diazo radical and in the radical of the coupling component, are condensed with the aforementioned acylating agents containing a fibre-reactive substituent.

Furthermore, the dyestuffs of the present application which contain as fibre-reactive substituent an acrylic acid radical, an α-chlorine or an α-bromine radical, may also be prepared by elimination of hydrogen halide. This may be very easily done by treating β-halogenpropionyl, α,β-dichloropropionyl or α,β-dibromopropionyl dyestuffs with an agent of alkaline reaction in an aqueous medium.

In the dyestuffs obtained according to the present process the mobile halogen atoms of the fibre-reactive substituents may be readily replaced, for example by reaction with ternary amines or with hydrazines (dimethylhydrazine), fibre-reactive dyestuffs being formed whose eliminable substituent is a quaternary ammonium or hydrazinium group bound to a carbon atom, particularly of a heterocyclic radical.

The dyestuffs obtained by the process of the invention are new. They are valuable dyestuffs which are suitable for dyeing and printing a wide variety of materials, particularly polyhydroxylated materials of fibrous structure, such as cellulosic materials both of synthetic fibres, for example from regenerated cellulose or natural cellulosic materials, for example cellulose, linen or particularly cotton. They are suitable for dyeing by the so-called direct dyeing method or by the padding method; but they are particularly suitable for dyeing according to the printing process in which the dyestuffs are applied to the goods to be dyed by printing or padding and fixed by means of an acid-binding agent, if necessary with heating.

The dyestuffs of the invention are distinguished particularly by a high degree of fixation, by the ease with which the unfixed portions of dyestuff can be washed out, and by their relatively high intensity both on cotton and on spun rayon. The wet fastness, especially fastness to washing of the dyeings and printings obtained is excellent.

The dyestuffs are also suitable for dyeing nitrogenous materials, such as for example textile materials from polyamides, polyurethanes and particularly wool. On these substrata the dyestuffs of the present invention which contain as reactive substituent a halogenated aliphatic radical yield especially good results.

The following examples illustrate the invention; the parts and percentages are by weight unless otherwise stated.

EXAMPLE 1

26.8 parts of p-phenylenediamine-2,5-disulphonic acid are neutralized in 200 parts of water with sodium carbonate, acidified with 25 parts of hydrochloric acid of 30% strength and diazotized at 10° C. with a solution of 6.9 parts of sodium nitrite. The diazo compound is poured into an alkaline solution of 44 parts of the sodium salt of 2-phenylamino-8-hydroxynaphthalene-6,3'-sulphonic acid and 20 parts of sodium carbonate. When coupling is complete, the coupling mixture is acidified and neutralized again with sodium hydroxide and cooled with ice to 5° C. A solution of 18.5 parts of cyanuric chloride, dissolved in 60 parts of acetone, is added and the mixture is stirred for 2 hours at 5° C., the reaction mixture being kept weakly acid to neutral by the dropwise addition of sodium hydroxide solution. When condensation is complete the resulting dichlorotriazine dyestuff is salted out and filtered off. The dyestuff paste is well mixed with a concentrated solution of 5 parts of disodium phosphate and 5 parts of monosodium phosphate and dried at 40° C. in vacuo. With this dyestuff a strong reddish brown tint is obtained on cotton.

EXAMPLE 2

The same procedure is followed as described in Example 1. After condensation with cyanuric chloride 50 parts of ammonia solution of 10% strength are added and the mixture stirred for 3 hours at a temperature between 30 and 40° C. The monochlorotriazine dyestuff is then salted out, filtered off and dried at 80° C. in vacuo.

The new dyestuff dyes cotton strong, reddish brown tints.

Dyeing prescription.—2 parts of dyestuff are mixed with 20 parts of urea, dissolved in 28 parts of water and stirred into 40 parts of sodium alginate thickening of 5% strength. 10 parts of a sodium carbonate solution of 10% strength are then added.

With the so-obtained printing paste a cellulosic fabric is printed on a roller printing machine, the resulting printed material is dried and steamed for 8 minutes at 100° C. in saturated steam. The printed fabric is then thoroughly rinsed in cold and hot water and dried.

EXAMPLE 3

26.8 parts of p-phenylenediamine-2,5-disulphonic acid are neutralized in 400 parts of water with sodium hydroxide. 21 parts of 2-isopropoxy-4,6-dichlorotriazine are added dropwise to this solution in the course of 30 minutes at a temperature between 5 and 10° C. By simultaneous dropwise addition of a dilute sodium hydroxide solution the pH value is maintained between 4 and 6. When condensation is complete, the resulting solution is acidified with 30 parts of concentrated hydrochloric acid and diazotized with an aqueous solution of 6.9 parts of sodium nitrite. The diazo compound is poured into an aqueous solution of 44 parts of the sodium salt of 2-phenylamino - 8 - hydroxy-naphthalene - 6,3' - disulphonic acid. By the addition of sodium carbonate the coupling mixture is maintained weakly alkaline. After coupling is complete, the resulting monochlorotriazine dyestuff is salted out, filtered off and dried. It dyes cotton reddish brown tints.

When the corresponding quantity of 2-$\beta$-ethoxyethoxy- or 2-$\beta$-methoxyethoxy-4,6-dichlorotriazine is used in the place of 2-isopropoxy-4,6-dichlorotriazine, dyestuffs with similar properties are obtained.

When 2 - phenylamino - 8 - hydroxynaphthalene-6-sulphonic acid-3'-carboxylic acid or 2-phenylamino-8-hydroxynaphthalene-6,4'-disulphonic acid is used as coupling component, very similar dyestuffs are obtained.

We claim:
1. An azo dyestuff of the formula

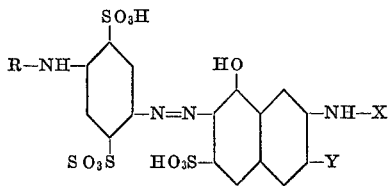

wherein X is phenyl or phenyl substituted by sulpho or carboxy; Y is hydrogen or the sulfonic acid group; and R is a fiber-reactive substituent selected from the group consisting of chloro, bromo, dichloro or dibromo alkanoyl of up to 3 carbon atoms; acryloyl, bromo, or chloroalkenoyl of up to 4 carbon atoms, propioloyl; and the residue of a six-membered heterocyclic group containing at least two nitrogen atoms and selected from the group consisting of dichlorotriazinyl, monochlorotriazinyl and substituted monochlorotriazinyl wherein the substituent is selected from the group consisting of phenyl, methyl, ethyl, $C_{1-6}$alkoxy, alkoxyalkoxy of up to 6 carbon atoms, phenoxy, chlorophenoxy, nitrophenoxy, naphthoxy, —$NH_2$, $C_{1-3}$alkylamino, $C_{1-4}$alkoxyamino, di-$_{1-2}$alkylamino $C_{1-2}$alkylphenylamino, chloroethylamino, ethanolamino, propanolamino, benzylamino, cyclohexylamino, morpholino, piperidino, piperazinyl, anilino, N-methylanilino, methylanilide, p-aminoacetanilide, nitroaniline, o-$C_{1-2}$alkoxyphenylamino, diphenylamino and naphthylamino.

2. A azo dyestuff of the formula

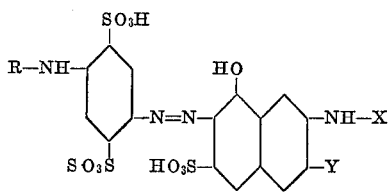

wherein X is phenyl or phenyl substituted by sulfonic acid or carboxy, Y is hydrogen or the sulfonic acid group and R is dichlorotriazinyl or monochlorotriazinyl that contains a substituent selected from the group consisting of —$NH_2$, alkoxy and alkoxyalkoxy of up to 6 carbon atoms.

3. An azo dyestuff as claimed in claim 2 wherein X is sulfophenyl or carboxyphenyl, Y is hydrogen and R is 4-chloro-1,3,5-triazinyl having from 3 to 6 carbon atoms in the alkoxy group.

4. An azo dyestuff as claimed in claim 2, wherein R is 2-alkoxy-4-chloro-1,3,5-triazinyl radical having 3 to 6 carbon atoms in the alkoxy group.

5. An azo dyestuff as claimed in claim 2, wherein R is isopropoxy chlorotriazinyl.

6. An azo dyestuff as claimed in claim 2, wherein R is 2-chloro-1,3,5-triazinyl having in 4-position an alkoxyalkoxy of 3 to 6 carbon atoms.

References Cited
UNITED STATES PATENTS

| | | | |
|---|---|---|---|
| 2,891,941 | 6/1959 | Pasciati et al. | 260—153 |
| 3,316,239 | 4/1967 | Riat et al. | 260—163 |
| 3,375,241 | 3/1968 | Siegel et al. | 260—154 |

CHARLES B. PARKER, Primary Examiner

D. M. PAPUGA, Assistant Examiner

U.S. Cl. X.R.

260—152, 154, 156, 158, 199